Dec. 18, 1973     W. J. LEONARD, JR     3,779,952
METAL-CONTAINING POLYMERS
Filed March 22, 1971
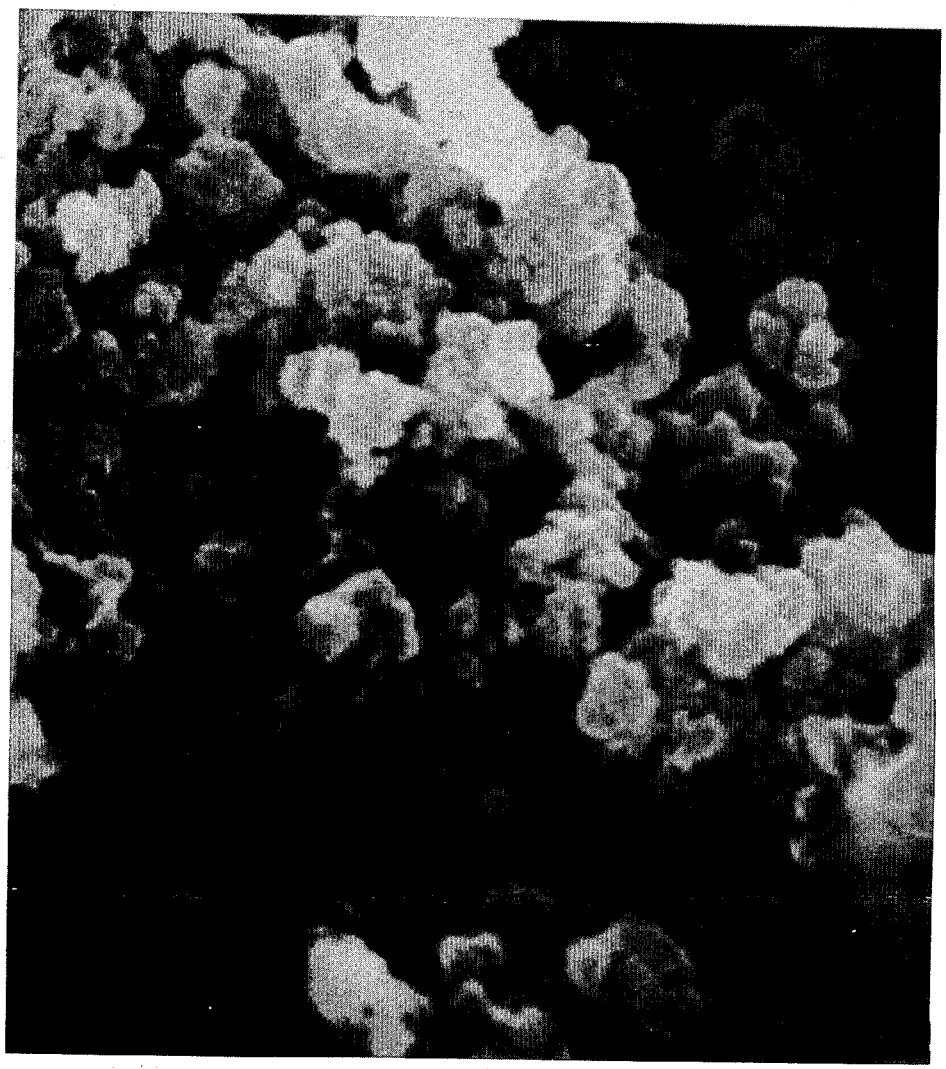
MAGNIFICATION x 20,000
INVENTOR:
WILLIAM J. LEONARD, JR.
BY: Howard W. Haworth
HIS ATTORNEY

United States Patent Office 3,779,952
Patented Dec. 18, 1973

3,779,952
METAL-CONTAINING POLYMERS
William J. Leonard, Jr., San Francisco, Calif., assignor to Shell Oil Company, New York, N.Y.
Filed Mar. 22, 1971, Ser. No. 126,736
Int. Cl. C08f 29/34, 47/08
U.S. Cl. 260—2.5 R    7 Claims

ABSTRACT OF THE DISCLOSURE

Porous, metal-ion-chain-bridged polymeric products having surface areas of at least 5 m.$^2$/g. useful as catalysts and for molecular separations are prepared by contacting Group III-B-V-A metal ions and a dilute, polar, non-aqueous solution of a polymerized ethylenically-unsaturated carboxylic acid and thereafter removing residual solvent from the resulting precipitate forming the porous metal/polymeric product.

BACKGROUND OF THE INVENTION

Field of the invention

This invention relates to novel polymers and their preparation. More particularly, the invention relates to porous, metal-ion-chain-bridged polymeric products. These materials are useful as catalysts, as substrates for gel permeation chromatography because of their pore size distribution and as molecular sieves.

The prior art

A variety of polymeric acids and their salts is well known and the subject of a variety of patents. One such patent is U.S. Pat. 1,984,417, issued Dec. 18, 1934, to Hermann Mark et al. which discloses the production of water-soluble sodium or ammonium salts of polyacrylic acids by hydrolysis of polymeric nitriles or halides as, for example, hydrolysis of polyacrylonitrile in the presence of an aqueous solution of a base such as NaOH or NH$_4$OH. The resulting product is solid and water-soluble. U.S. Pat. 2,833,745, issued May 6, 1958, to Hans Fikentscher discloses a method for preparing alkali metal and ammonium salts of polymerized alpha,beta-unsaturated aliphatic acids. This method involves the initial formation of a monomeric salt and subsequent polymerization to give a water-soluble product. A similar process, employing different metals, is disclosed in U.S. 3,024,222, issued Mar. 6, 1962, to Meyer L. Freedman et al. In this process, lead, zinc or cadmium salts of polyacrylic acid are prepared. A monomeric salt is initially formed, and then the salt is polymerized to give a glassy solid product.

These prior products and processes, like the products and processes of this invention, are rather unique. The Mark et al. and Fikentscher processes are designed to yield highly water-soluble salts useful as soil conditioners, and the Freedman process is designed to give clear glassy products for structural and optical purposes. These processes do not form water-insoluble-porous materials having sufficiently uniform pores to be useful as a molecular sieve or useful as a heterogeneous catalyst. Such materials are the subject of this invention.

STATEMENT OF THE INVENTION

A novel type of chain-bridged polymerized metal carboxylate salt has now been produced. These salts are rigid and highly porous and comprise polymerized ethylenically-unsaturated carboxylic acids in combination with from about 0.2 to 1.0 mole, per equivalent of polyacid of one or more Group IIIb–Va metals. Such salts are prepared by the process of (A) contacting at moderate temperature a dilute solution of polymerized ethylenically-unsaturated carboxylic acids in polar non-aqueous solvent, and at least about 0.2 mole, per equivalent of polyacid, of ions of at least one Group IIIb–Va metal, (B) recovering the resulting gelatinous precipitate of swollen metal-polyacid product and (C) removing residual solvent from the gelatinous product of step (B) to form a free-flowing powder of the rigid porous metal-ion-chain-bridged polyacid salt.

BRIEF DESCRIPTION OF THE DRAWING

The invention will be described with refrence to the drawing wherein the sole figure is an electronphotomicrograph of a metal-polyacid product in accordance with this invention.

DETAILED DESCRIPTION OF THE INVENTION

The new metal-complexed polymers of the invention comprise rigid, porous metal-ion-chain-bridged polymers of unsaturated acids.

The polymeric acids

The polymeric acids used in preparing the metal-containing polymers consist essentially of polymers or copolymers derived solely from hydrocarbon carboxylic acid monomers of up to 10 carbon atoms possessing at least one carboxy group and at least one ethylenic linkage, i.e., a non-aromatic carbon-carbon double bond. The acids may also contain additional carbon-carbon unsaturation in the molecules, such as, aromatic unsaturation. Suitable acids include, for example, vinylhydrogenphthalate, vinyl benzoic acid, acrylic acid and maleic acid. Preferred polymeric acids are polymers of lower alkenoic acids which contain from one to two carboxy groups, from one to two ethylenic linkages as the sole carbon-carbon unsaturation and contain from three to six carbon atoms including the carboxy carbon atom(s).

Illustrative of monocarboxylic alkenoic acids of this type, from which suitable polymerized acids can be prepared, are acrylic acid, methacrylic acid, crotonic acid, 3-pentenoic acid, sorbic acid, 2-methyl-2-butenoic acid and ethacrylic acid, while illustrative dicarboxylic alkenoic acid from which suitable polymers can be made include maleic acid, fumaric acid, citraconic acid, mesaconic acid, itaconic acid, 2-methyleneglutaric acid and 2-penendioic acid. In general, polymers of monocarboxylic acids are preferred over analogous polymers of dicarboxylic acids, and further preferred are those of monocarboxylic alkenoic acids wherein the ethylenic linkage is conjugated with the carboxy group and is a terminal ethylenic linkage. Most preferred are polymers of acrylic acid and the alpha-alkyl derivatives thereof wherein the alkyl has from one to three carbon atoms, particularly one carbon atom, i.e., methacrylic acid.

It is essential that the acid be polymerized prior to combination with the metal ions if the desired porous product is to be obtained. Suitably the acid is polymerized to an average molecular weight of at least 500. The upper limit on the average molecular weight of the polymeric acid is not critical. Polymerized acids having an average molecular weight of up to about 2,000,000 can be used. Polymerized acids of average molecular weight of from about 2,000 to about 500,000 are preferred, giving excellent porous products and having generally low viscosities which provide processing and handling advantages.

The polymerized acid is employed as a dilute solution in a suitable inert solvent as defined below. The concentration of the polyacid in solution is suitably less than 2 equivalents of acid per liter. Preferably, the polyacid concentration is from 0.1 to 1.5 equivalents per liter, most preferably it is from 0.2 to 1 equivalent per liter.

The metals

Ions of at least one metal are added to the polymeric acids. Suitable metals include the Group IIIb–Va metals of the Periodic Table of the Elements as found in the 49th edition of the Chemical Rubber Corporation Handbook of Chemistry and Physics. The suitable metals, therefore, include the group known as the transition metals, that is, the metals in periodic sequence from scandium to zinc, from yttrium to cadmium, and from lanthanum to mercury, the metals of Group IIIa (aluminum, gallium, indium, and thallium), as well as the metals of Group IVa, i.e., silicon, germanium, tin and lead, and the Group Va metals arsenic, antimony and bismuth. Of these metals, those metals of Groups IVb–Ia are preferred with the metals, aluminum, titanium, zirconium, chromium, iron, cobalt, nickel, copper, zinc, cadmium, palladium, and silver being most preferred.

Mixtures of metals may also be employed. For example, aluminum may be used with silver, aluminum with palladium, aluminum with nickel and nickel with cobalt. The metals are contacted with the polymerized acid in the form of electropositive metal ions. For example, nickel is added as $Ni^{II}$, copper as $Cu^I$ or $Cu^{II}$, silver as $Ag^I$, titanium as $Ti^{IV}$ and aluminum as $Al^{III}$.

Since the metal ions are to be contacted with the polyacids in a polar non-aqueous medium, the metal must be in the form of salts or complexes which are soluble in the non-aqueous media. Examples of such salts and complexes are salts of carboxylic acids, such as formates, acetates, butyrates, hexanoates, adipates and citrates; alcoholates, such as ethylates, propylates, isopropylates, hexylates and phenylates; complexes, such as acetylacetanoates; the soluble salts of mineral acids, such as $H_2PtCl_6$, $AgNO_3$ and $CuCl_2$; and metal alkyls, such as tetramethyltitanium, di-n-butylmagnesium, diethylzinc, triethylaluminum and tetraethyltin.

The metal acids, like the polyacids, are generally employed as a solution in a non-aqueous solvent as will be described below.

The solvent

The solvents for the polyacid and the metal salts and the medium of their contact are inert, preferably non-aqueous and polar. If different solvents are employed for the polyacid and the metal salts, each solvent should be selected so as to not cause precipitation of either reactant when the solutions of polyacid and metal salt are combined. Suitable solvents include polar substituted hydrocarbons, for example oxygenated hydrocarbons such as alcohols, ketones, and cyclic ethers, preferably of from 1 to 6 carbon atoms. Illustrative of such solvents are methanol, ethanol, isopropanol, ethylene glycol, hexanol, acetone, methyl isobutyl ketone, dioxane, tetrahydrofuran, and their mixtures as well as other substituted hydrocarbons such as acetonitrile, dimethylformamide, dimethylsulfoxide and hexafluoroisopropanol. While useful on occasion, water or solvent mixtures containing a major proportion of water are preferably avoided. Minor proportions of water may be present, however. Likewise, minor amounts of non-polar solvents such as benzene or hexene may be present. Most preferred solvents for this process are the lower oxahydrocarbons including monoalkanols of from 1 to 3 carbon atoms, tetrahydrofuran and dioxane.

The preparation process

The preparation process comprises the three steps of (A) contacting a dilute solution of polymeric acid with ions of one or more Groups IIIb–Va metals said ions being added preferably in solution, with agitation and at a relatively low temperature, (B) separating as the resulting gelatinous precipitate of the polyacid-metal compound which forms, and (C) removing residual solvent from the amorphous product of step (B), thereby forming the chain-bridged, rigid, porous polyacid-metal product of the invention as a free-flowing powder.

When the metal ions are being contacted with the polyacid, efforts should be taken to avoid localized high concentrations of metal ions. To this end, the metal salts are added as dilute solutions themselves, preferably as solutions having concentrations in the range of from 0.05 to 2 equivalents of metal ion per liter. Also, agitation (e.g., stirring) is generally advisable. To avoid high concentrations the contacting can be gradual, over a period of from ¼ to 2 hours. Preferably the contacting of the metal ions and polyacid is effected over 0.5 to 1.5 hours.

The metals and polyacid are preferably contacted at ambient or moderately elevated temperatures. Suitable temperatures are generally from about 10° C. to about 125° C. with temperatures of from 25° C. to 100° C. being preferred.

The polyacid-metal-ion products which form contain at most one mole of metal ion per equivalent of polyacid. It is often desirable, however, to employ a molar excess of metal ions in the solution during the polyacid contacting. Suitable metal ion quantities vary from 0.1 to 5.0 moles of metal ion per equivalent of polyacid. Preferably, from 0.2 to 3 moles or metal ion per equivalent of acid, are employed.

When the metal ion solution is added, a metal-polyacid product forms. It is in the form of a gelatinous precipitate. This gelatinous precipitate is simply recovered from the bulk of the reaction medium by centrifugation, filtration, settling, decantation and other similar processes.

The gelatinous precipitate is optionally washed, following recovery, using an inert wash liquid which is a solvent for any unreacted metal salt which may remain on the precipitate. Suitable solvents are those described above.

To form the rigid, porous metal-ion-chain-bridged polyacid product of the invention, it is necessary to remove residual solvent from the gelatinous precipitate. The rigid porous product is typically produced when at least about 80% of the solvent incorporated in the gelatinous precipitate is removed. Preferably at least about 90% of the solvent is removed with removal of solvent to dryness being most preferred. This solvent removal is effected by conventional means using conventional apparatus. For example, the solvent can be removed by vacuum evaporation, by mild heating, or by combinations of heating and vacuum, such as in forced air ovens, vacuum ovens, and the like. If heat is used to remove the residual solvent, it is desirable to limit temperatures to below about 100° C. Higher temperatures can often be employed but may lead to some decomposition of the porous product in the case of certain polyacid/metal combinations.

If desired, the rigid porous metal-ion-chain bridged product can be washed following solvent removal. Even when the original solvent is used to wash the rigid product, there is no reformation of the gelatinous intermediate. The rigid porous final product remains intact.

The polyacid-metal product

The polyacid-metal products of this invention contain from 0.1 to 1.0 mole of metal ion per equivalent of polyacid, preferably from 0.2 to 1.0 mole of metal ion per equivalent of polyacid. With monovalent metal ions, the starting materials preferably contain from 0.3 to about 1.0 mole of metal ion per equivalent of polyacid. With divalent metal ions, the starting materials preferably contain from 0.3 to about 2.0 equivalents of metal ion per equivalent of polyacid while with trivalent metal ions the preferred ion content is from 0.3 to about 3.0 equivalents of metal ion per equivalent of polyacid. The polymerized acid-metal products are rigid and non-fusible, and decompose on heating. They are insoluble and do not swell appreciably in water and common organic solvents such as acetone, cyclohexene, ether, or dioxane. The products are soluble in strong acids and bases and are porous, having specific surface areas of at least about 5 m.²/g., usually from 15 to 600 m.²/g., most commonly having surface areas of from 50 m.²/g. to 400 m.²/g. as measured by the B.E.T. method. This method is described in detail in Brunauer, S., Emmet, P. H., and Teller, E., J. Am. Chem. Soc., 60, 309–16 (1938). Products of this invention have volume median pore diameters of from 25 to about 500 A., as measured by ntirogen adsorption isotherm. The nitrogen adsorption isotherm method is descibed in detail in Barrett, E. P., Joyner, L. G. and Helenda, P. P., J. Am. Chem. Soc., 73, 373–80 (1951).

From the physical form of the resulting product it is indicated that the metal-polyacid products of this invention are a unique type of polyacid salt. Their rigid porous structure indicates that the metal ions have become associated with the polyacids as chain-bridging agents. Unlike conventional cross-linked polymer networks, such as vulcanized rubber and cured resins, wherein the polymer chains are predominately covalently linked one to another, that is essentially intermolecularly, the products of this invention have a major proportion of intramolecular ionic chain bridges. Individual polyacid chains appear to be coiled and bridged by the metal ions of the polymer. This bridging is in the form of bonds through a metal ion between acid sites or in the form of a combination of ionic and coordination bonding. Examples of the instant product, when examined by scanning electron microscope, reveal that they have a highly particulate microstructure. The products exhibit a clustered particulate microstructure similar to the microstructure of silica gels. This structure is illustrated in the figure, an electronphotomicrograph of an aluminum/polyacrylic acid product in accordance with this invention. This product appears to be made up of small spheres having diameters in the range of from 100 A. to about 5000 A.

The invention will be further described with reference to the following examples. These are provided for illustrative purposes and are not intended to limit the scope of the invention.

EXAMPLE I (A) A solution of acrylic acid in dioxane containing 0.1% w. azobisisobutyronitrile and 0.06% w. azobiscyclohexanenitrile was held 16 hours at 90° C. to give a polyacrylic acid having an average molecular weight, as determined by viscosity measurement, of about 1,000,000. A 2,000 ml. portion of this polyacrylic acid solution containing 0.55 equivalent of acid was heated to 50° C. and maintained at that temperature. Gradually, with stirring, a solution of 0.65 mole of nickel$^{II}$ hexanoate in 2,000 ml. of dioxane, was added to the polyacrylic acid over a period of 1.5 hours. A gelatinous mass of pale green precipitate formed and was centrifuged from the bulk of the solvent. The precipitate was washed several times with dioxane to remove unreacted metal salts. Occluded solvent was removed to dryness at 100° C., to leave 29 grams of a pale green powder which had a pore volume of 0.16 cc./g. and a surface area of 125 m.²/g. as determined by nitrogen adsorption. The median pore diameter was 70 A. Analysis of this product showed it contained:

|   | Percent w. |
|---|---|
| Ni | 17.4 |
| C | 42.2 |
| H | 5.3 |
| O (by difference) | 35.1 |

Thus, the final product contained 0.51 equivalent of nickel$^{II}$ per equivalent of acid.

(B) A 0.36 g. sample of the product of part (A) was used to catalyze the hydrogenation of olefins. The catalyst, 6.0 g. of n-heptane solvent, 0.18 g. hexene-1 and 0.18 g. of cyclohexene was charged to a bomb, which was heated to 300° C. and then pressured to 605 p.s.i.g. with hydrogen. After 50 minutes, 15% of the olefins had been hydrogenated.

EXAMPLE II

Using the general procedure of Example I, a copper/aluminum-polyacrylate product was prepared. Over a period of 1.5 hours, 1,000 ml. of a dioxane solution containing 0.049 mole of cupric bistetraisopropoxyaluminate, Cu[Al(O-i-Pr)$_4$]$_2$, was added to 3,000 ml. of a 0.13 molar dioxane solution of polyacrylic acid (average molecular weight 10,000). The temperature was 50° C. A gelatinous mass formed which was separated by centrifugation and vacuum at 100° C. for 5 hours to yield 41 grams of a fluffy pale blue porous product. This product had a pore volume of 0.32 cc./g. and a surface area of 179 m.²/g. and contained 7.1% by weight copper and 7.0% by weight aluminum or 0.19 equivalent of copper and 0.65 equivalent of polyacid.

EXAMPLE III (A) Using the general procedure of Example I, a palladium/aluminum polyacrylate product was prepared. Three grams of polyacrylic acid dissolved in 600 ml. dioxane was added over a period of 30 minutes to 0.00155 mole of palladium acetate, Pd(OAc)$_2$, in 200 ml. dioxane. The mixed solution was maintained at 24° C. during the addition. To the resulting mixture a solution of 0.014 mole aluminum isopropoxide, Al(O-i-Pr)$_3$, dissolved in 450 ml. dioxane was added over a period of one hour. Again the temperature was maintained at 24° C. The light brown precipitate that formed on adding the aluminum isopropoxide was filtered, washed with dioxane and dried in vacuo at 45° C. to yield 4.3 grams of product. This material had a pore volume of 0.42 cc./g. and a B.E.T. specific surface area of 209 m.²/g. The volume median pore diameter was 150 A. Analyses of the product showed it contained:

|   | Percent w. |
|---|---|
| Pd | 4.1 |
| Ni | 9.6 |
| C | 40.1 |
| H | 4.2 |
| O | 42.7 |

(B) A 0.36 g. sample of the product of part (A) was tested as a hydrogenation catalyst in accordance with the procedure of Example I. The temperature was 25–30° C., and the hydrogen pressure was 640 p.s.i.g. In 27 minutes, 48–53% of the olefinic reactants were hydrogenated.

EXAMPLE IV (A) Using the general procedures of Example I a copper polyacrylate having pores with a volume median pore diameter of 500 A. was formed.

300 ml. of dioxane containing 0.0134 mole of copper (II) acetate (Cu(OAc)$_2$H$_2$O) was added over a period of five minutes to 50 ml. of dried dioxane containing 1.0 g. of polyacrylic acid. The temperature was maintained at about 80° C. during the addition of the cupric salt to the polymer. The resulting mixture contained a light gelatinous blue precipitate. After cooling slowly to 25° C., the precipitate was filtered, washed with fresh dioxane and heated to dryness at 60° C. for 10 hours to remove residual solvent. Approximately 1.4 g. of a copper polyacrylate product was obtained. This material was insoluble in water and all common organic solvents such as acetone, methanol, carbon tetrachloride, and dimethylsulfoxide. It had a pore volume of 0.6 cc./g. and a B.E.T. specific surface area of 145 m.²/g. Analysis of the product showed it contained 30% w. Cu.

(B) Adsorption isotherms for hexane and cyclohexane showed essentially no difference in capacity for either hydrocarbon. The large pores obtained in this material indicate its utility in macromolecular separations. e.g., gel permeation chromtography.

EXAMPLE V (A) Three grams of polyacrylic acid as prepared in Example I was dissolved in 300 ml. of dimethylformamide. The polymer solution was heated and maintained at 120° C. during the addition of a solution of 0.027 mole of $Cu(OAc)_2H_2O$ in 35 ml. of dimethylformamide. The combined solution was distilled under a nitrogen blanket at 310 mm. mercury with occasional addition of dimethylformamide to maintain volume. The distillate contained acetic acid. The mixture was cooled and the 4.0 g. of a green gel precipitate which formed was separated by centrifugation, rinsed and dried. The dried polymer was a powder and had a pore volume of 0.22 cc./g. and a B.E.T. specific surface area of 257 m.$^2$/g. The volume median pore diameter was less than 30 A. Analysis of the product showed it contained,

| | Percent w. |
|---|---|
| Cu | 28.0 |
| C | 35.4 |
| H | 4.0 |
| O | 31.8 |

Thus, the final product contained 0.96 equivalent of Cu(II) per equivalent acid.

(B) Adsorption isotherms for hexane and cyclohexane were measured. The volume capacity of hexane was approximately equal to the $N_2$ pore volume and twice that found for cyclohexane. These isotherms show that size separations can be performed using polymers prepared in this way.

EXAMPLE VI

A solution of 5.3 g. of poly(maleic anhydride) in 200 ml. of dioxane containing by titration 0.05 equivalent of carboxylate groups was mixed at 85° C. with one liter of dioxane containing 0.05 mole of cupric acetate hydrate. The mixture was held at 85° C. for 30 minutes and the solids were removed and washed with a 50/50 v. acetone-methanol mixture. After vacuum drying at 50° C. 4.8 g. of deep green porous product was obtained containing 14.7% w. Cu.

EXAMPLE VII

A solution of 30.6 g. (0.15 mole) of aluminum isopropoxide in a liter of isopropanol was added to polyacrylic acid containing 0.45 equivalent of carboxylate groups in 3.0 liters of isopropanol over 1.5 hours at 25° C. The precipitated product was separated by centrifugation and washed with isopropanol. After vacuum drying at 80° C., 37.1 g. of product was obtained which contained 8.4% w. Al. This product had a pore volume of 0.76 cc./g. and a surface area of 312 m.$^2$/g. This preparation method and these materials were used to prepare the aluminum-containing product illustrated in the figure.

EXAMPLE VIII

A solution of 6.8 g. (0.033 mole) of aluminum isopropoxide in 200 ml. of isopropanol was mixed over about 10 seconds with a solution of polyacrylic acid containing 0.204 equivalent of carboxylate group in 200 ml. of isopropanol while holding the temperature at 40–50° C. The precipitate was isolated by centrifugation and was vacuum dried to obtain 9.6 g. of white solid containing 6.8% w. Al and having a pore volume of 0.42 cc./g. and a surface area of 135 m.$^2$/g.

EXAMPLE IX (A) A solution containing 0.05 mole of zirconium tetra-n-butoxide, in 200 ml. of isopropanol was added over 100 minutes to a solution of polyacrylic acid having a molecular weight of about 1,000,000 containing 0.20 equivalent of carboxylate in 500 ml. of isopropanol while holding the temperature at 30–40° C. Following the addition, the mixture was stirred at 70° C. for 1 hour. The precipitate was centrifuged, washed with isopropanol and then vacuum dried. The 20.2 g. of isolated product contained 28% w. Zr and had a 0.53 cc./g. pore volume and a 149 m.$^2$/g. surface area.

(B) Five grams of this product was slurried in ether and 0.12 g. of $H_2PtCl_6 \cdot 4.5H_2O$ in 40 ml. of acetone was added at 25° C. The chloroplatinic acid was immediately adsorbed from the solution on to the surface of the precipitate. The isolated, very pale orange product contained 0.79% w. Pt and was an active catalyst for the hydrogenation of olefins.

EXAMPLE X

Three grams of polyacrylic acid as prepared in Example I was dissolved in 80 ml. of methanol. The polymer solution was maintained at 25° C. during the addition of 0.049 mole of $Zn(OAc)_2$ in 400 ml. of methanol. After the adition of 200 ml. of the $Zn(OAc)_2$ solution a white gelatinous precipitate started to form. Precipitation was complete on addition of the remainder of the zinc solution. The gelatinous precipitate was washed with excess methanol and dried at 45° C. in vacuo. The product had a pore volume of 0.21 cc./g. and a B.E.T. surface area of 116 m.$^2$/g. Analysis of the product showed it contained 36% w. Zu or 1.2 equivalents of zinc per equivalent of polymer carboxyl.

EXAMPLE XI

A polymer was prepared from an ethylenically unsaturated aromatic acid. A solution 5.7 g. (0.028 mole) of aluminum isopropoxide in 200 ml. of acetone was added to poly[vinyl hydrogen phthalate] (Eastman Chemical) containing 0.053 equivalent of carboxyl groups in 1.0 liter acetone. Addition was made at 40° C. over a period of 45 minutes. After the addition was complete, the mixture containing a white gelatinous precipitate was gently refluxed for one hour. The mixture was then cooled and the gelatinous precipitate removed by filtration. The precipitate was washed twice with fresh acetone and dried at 40° C. in vacuo. The free-flowing material recovered weighed 11.0 g. It had a pore volume of 0.20 cc./g. and a surface area of 80 m.$^2$/g.

COMPARATIVE EXPERIMENT A

Example X was repeated with the exception that water was used in place of the methanol as solvent for both the polymer and zinc aectate, a second zinc polyacrylate was formed. After drying the product had a negligible pore volume and a B.E.T. surface area of less than 15 m.$^2$/g. Analysis of the product showed it contained 22% w. Zn or 0.6 equivalent Zn per equivalent of polymer carboxyl.

I claim as my invention:

1. A rigid porous polymeric chain-bridged product consisting essentially of a polymerized carboxylic acid and from 0.1 to 1.0 mole per equivalent of polymerized acid of ions of metals selected from the group consisting of Group IIIb–Va of the Periodic Table; said rigid porous polymeric chain-bridged product being prepared by a three-step process which comprises (A) contacting a dilute polar solution of said polymerized carboxylic acid made up of monomeric units derived solely from hydrocarbon carboxylic acid monomers of up to 10 carbon atoms possessing at least one carboxy group and at least one ethylenic linkage with ions of one or more of said Group IIIb–Va metals at a temperature of from about 10° C. to about 125° C., (B) recovering the resulting gelatinous precipitate of the polyacid-metal compound which forms and (C) removing the residual solvent from the gelatinous precipitate.

2. The rigid porous polymeric composition in accordance with claim 1 wherein the polymeric carboxylic acid is a polymeric alkenoic acid and wherein the composition has a specific surface area of from 15 m.$^2$/g. to 600 m.$^2$/g.

3. The rigid porous polymeric composition in accordance with claim 2 wherein the polymeric carboxylic acid is selected from the group consisting of polyacrylic acid and poly alpha-alkylacrylic acid, wherein said alkyl is of from one to three carbon atoms.

4. The rigid porous polymeric composition in accordance with claim 3 wherein the ions of metals are selected from ions of aluminum, nickel, copper, palladium and silver.

5. A process for preparing a rigid porous metal-ion-chain-bridged polyacid salt which comprises contacting a dilute polar solution consisting essentially of (a) polymerized ethylenically unsaturated carboxylic acid, said polymerized acid being made up of monomeric units derived solely from hydrocarbon carboxylic acid monomers of up to 10 carbon atoms possessing at least one carboxy group and at least one ethylenic linkage and having an average molecular weight in the range of from 500 to 2,000,000; and (b) from about 0.1 to about 5.0 moles, per equivalent of polyacid, of ions of at least one Group IIIb–Va metal at a temperature of from about 10° C. to about 125° C.; recovering the resulting gelatinous metal-ion-polyacid precipitate and removing residual solvent from the gelatinous precipitate, thereby forming a rigid porous metal-ion-chain-bridged polyacid salt product having a specific surface area of at least about 5 m.²/g. and a volume median pore diameter of from 25 to about 500 A.

6. The process in accordance with claim 5 wherein the polymerized acid is selected from the group consisting of polyacrylic acid and poly alpha-alkyl-acrylic acid, wherein said alkyl is from one to three carbon atoms.

7. The process in accordance with claim 6 wherein the dilute non-aqueous solution of polymerized acid has a concentration of from 0.1 to 1.5 equivalents of acid per liter and wherein the polymerized acid has an average molecular weight in the range of from 2,000 to 500,000.

References Cited

UNITED STATES PATENTS

| | | | |
|---|---|---|---|
| 2,253,128 | 8/1941 | Langkammerer | 260—80.3 R |
| 3,024,222 | 3/1962 | Freedman et al. | 260—429 R |
| 3,220,960 | 11/1965 | Wichterle | 260—2.5 R |
| 3,180,844 | 4/1965 | Dickerson | 260—Dig. 31 |
| 3,322,734 | 5/1967 | Rees | 260—Dig. 31 |

OTHER REFERENCES

Chemical Abstract, "Grafted Acrylic Polymers Branched With Metal Containing Polymers," vol. 69, p. 4437c, (1969).

WILBERT J. BRIGGS, SR., Primary Examiner

U.S. Cl. X.R.

210—510; 260—2.5 M, 78.4 R, 78.5 R, 80 P, 80 L, 96 R, Dig. 31, Dig. 33